(12) United States Patent
LaRosa et al.

(10) Patent No.: US 6,243,410 B1
(45) Date of Patent: Jun. 5, 2001

(54) DEMODULATOR HAVING AN INFINITE-DURATION IMPULSE RESPONSE FILTER WITH DYNAMIC COEFFIECIENT SCALING

(75) Inventors: Christopher Peter LaRosa, Lake Zurich; Michael John Carney, Mundelein; Christopher John Becker, Palatine, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/089,992

(22) Filed: Jun. 3, 1998

Related U.S. Application Data

(60) Division of application No. 08/808,331, filed on Feb. 28, 1997, now Pat. No. 5,799,011, which is a continuation-in-part of application No. 08/624,329, filed on Mar. 29, 1996, now Pat. No. 5,737,327.

(51) Int. Cl.[7] .................................................. H04B 1/707
(52) U.S. Cl. ......................... 375/148; 375/233; 375/350
(58) Field of Search .................................. 375/130, 147, 375/150, 229, 232, 233, 350, 148

(56) References Cited

U.S. PATENT DOCUMENTS

| | | |
|---|---|---|
| 4,901,307 | 2/1990 | Gilhousen et al. . |
| 5,612,991 | 3/1997 | Nair et al. . |
| 5,696,699 | 12/1997 | Nair . |
| 5,786,779 | * 7/1998 | Chun et al. ............................. 341/61 |
| 5,787,125 | * 7/1998 | Mittel .................................. 375/329 |
| 5,799,037 | * 8/1998 | Strolle et al. ......................... 375/233 |
| 6,047,022 | * 4/2000 | Reuven ................................. 375/222 |

FOREIGN PATENT DOCUMENTS

| | | |
|---|---|---|
| 0668665A1 | 8/1995 | (EP) . |
| 2280575 | 2/1995 | (GB) . |
| 2311445 | 9/1997 | (GB) . |
| 2311702 | 10/1997 | (GB) . |

OTHER PUBLICATIONS

Andrew J. Viterbi, CDMA: Principles of Spread Spectrum Communication 86–93 (1995).

* cited by examiner

*Primary Examiner*—Don N. Vo
(74) *Attorney, Agent, or Firm*—Sylvia Chen; Roland K. Bowler, II

(57) ABSTRACT

By time-sharing demodulator hardware between a primary data path (165), a power control data path (161), and a received signal strength indicator (RSSI) path (163), an entire power control data path (161) can be implemented in a demodulator (140) of a spread spectrum subscriber unit receiver with a low increase in gate count. The primary data path (165) and the power control data path (161) time-share a complex conjugate generator (270), a complex multiplier (280), and a real component extractor (290). Due to timing requirements, though, the channel estimation filter (240) of the primary data path cannot be time-shared with the power control data path. Instead, dynamic coefficient scaling is added to an infinite-duration impulse response (IIR) filter in the RSSI path (163) so that the IIR filter (250) with dynamic coefficient scaling can be time-shared between the RSSI path (163) and the power control data path (161).

8 Claims, 3 Drawing Sheets

DEMODULATOR HAVING AN INFINITE-DURATION IMPULSE RESPONSE FILTER WITH DYNAMIC COEFFIECIENT SCALING

CROSS REFERENCE TO RELATED APPLICATIONS

This patent application is a division of U.S. patent application Ser. No. 08/808,331 filed Feb. 28, 1997 by Christopher P. LaRosa et al. and entitled "CDMA Power Control Channel Estimation Using Dynamic Coefficient Scaling," now U.S. Pat. No. 5,799,011 which is a continuation-in-part of U.S. patent application Ser. No. 08/624,329 filed Mar. 29, 1996 by Fuyun Ling et al. and entitled "Method and Apparatus for Demodulation and Power Control Bit Detection in a Spread Spectrum Communication System," now U.S. Pat. No. 5,737,327. These related applications are assigned to the assignee of the present application and are hereby incorporated herein in their entirety by this reference thereto and priority thereto for common subject matter is hereby claimed.

FIELD OF THE INVENTION

This invention relates generally to spread spectrum radio communication, and more particularly to power control channel estimation in a Direct Sequence Code Division Multiple Access (DS-CDMA) communication system.

BACKGROUND OF THE INVENTION

One type of cellular radiotelephone system using direct sequence spread spectrum techniques, commonly known as the Direct Sequence Code Division Multiple Access (DS-CDMA) system, is governed by the Interim Standard IS-95 specification adopted by the Telecommunications Industry Association (TIA). A similar spread spectrum system, Digital Communication System (DCS) 1900, operates at 1900 MHz. In these spread spectrum communication systems and others, individual signals are spread using a wideband pseudonoise code and then transmitted on a wide radio frequency (RF) band. A spread spectrum receiver obtains a signal of interest by despreading a received wideband signal using the same code that was used to spread the signal.

In many spread spectrum communication systems, downlink transmissions from a base station to subscriber units include a pilot channel and various traffic channels. All subscriber units decode the pilot channel; therefore, all the subscriber units know the spreading code of the pilot channel. Each traffic channel, however, is intended to be decoded by only a single subscriber unit. Thus, the base station encodes each traffic channel with an individual spreading code to be used by only one subscriber unit at a time.

In some CDMA systems, a traffic channel downlink signal includes a power control indicator in the data stream that allows the base station to control individually the transmission power of a subscriber unit in its coverage area. After extracting the power control indicator, a subscriber unit responds to the power control command by adjusting its transmission power. This power control method accommodates changing channel conditions, such as fading or blocking, while retaining spectral efficiency and minimizing interference within the system.

Effective and efficient power control is vital to system performance. In fact, section 6.1.2.4.2 of the IS-95 specification requires a subscriber unit to respond to power control commands within 500 microseconds of reception of the power control indicator. Thus, there is a need for rapid and accurate detection of spread spectrum power control indicators included in traffic channel downlink signals without significantly increasing processing requirements.

DETAILED DESCRIPTION OF THE PREFERRED EMBODIMENT

By time-sharing demodulator hardware between a primary data path, a power control data path, and a received signal strength indicator (RSSI) path, the entire power control data path of a spread spectrum subscriber unit receiver can be implemented with a low increase in gate count. The primary data path and the power control data path time-share a complex conjugate generator, a complex multiplier, and a real component extractor. Due to timing requirements, though, the channel estimation filter of the primary data path cannot be time-shared with the power control data path. Instead, dynamic coefficient scaling is added to an infinite-duration impulse response (IIR) filter in the RSSI path, so that the IIR filter with dynamic coefficient scaling can be time-shared between the RSSI path and the power control data path.

Figure 1:
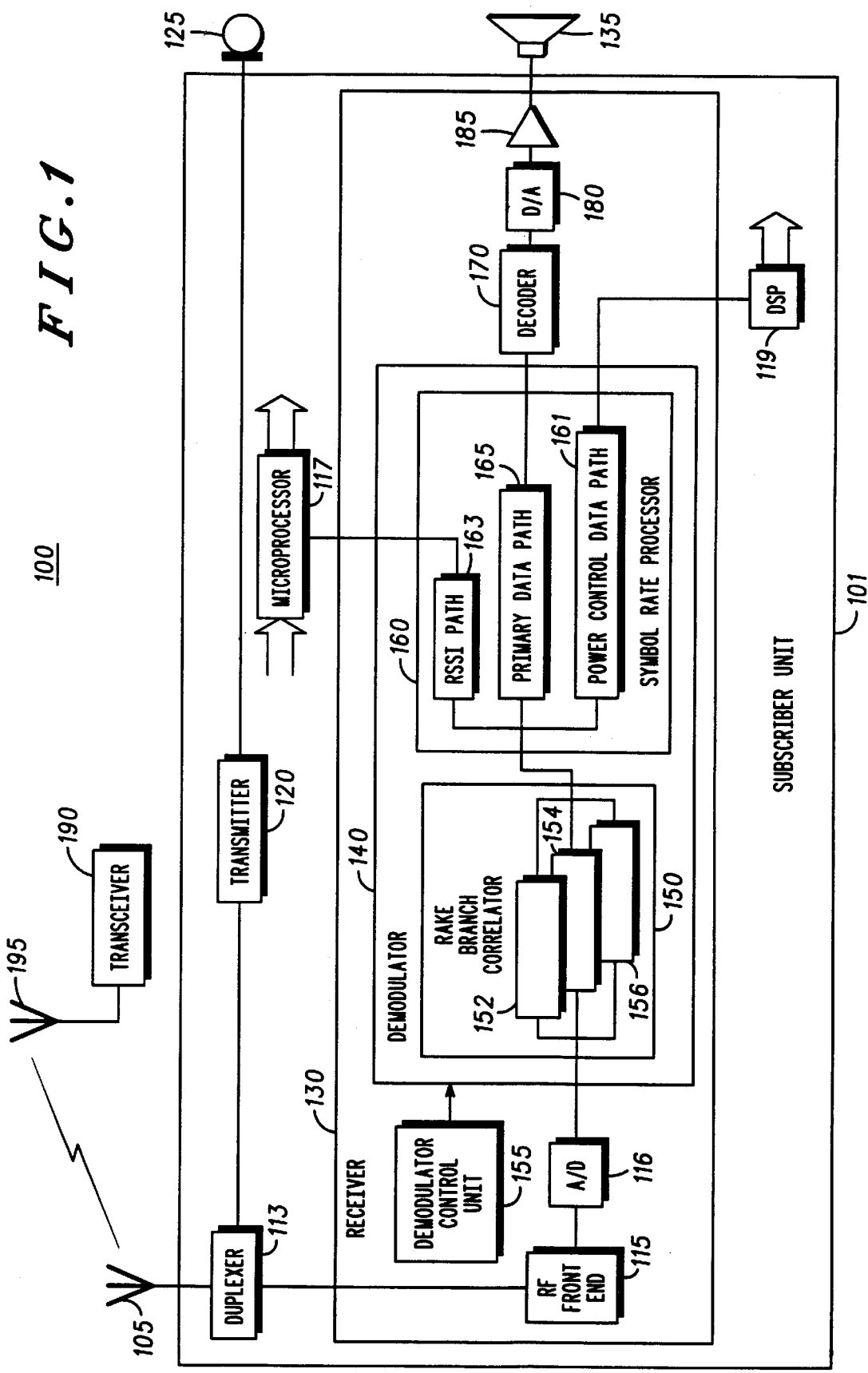
FIG. 1 is a block diagram of a DS-CDMA communication system including a radiotelephone subscriber unit.

FIG. 1 is a block diagram of a DS-CDMA communication system 100 including a radiotelephone subscriber unit 101. The subscriber unit 101 has a microphone 125 that receives audio signals. The subscriber unit 101 prepares the audio signals for spread spectrum transmission over a communication channel using transmitter 120. The transmission signals pass through duplexer 113 to antenna 105. A complementary communication device, such as a spread spectrum base station transceiver 190, uses an antenna 195 to receive signals from the subscriber unit 101 over a communication channel. The transceiver 190 also transmits traffic channel and pilot channel signals to subscriber unit 101, which are received by antenna 105 over a communication channel.

The received signals pass through duplexer 113 to receiver 130. The receiver 130 includes an RF front end 115, an analog-to-digital (A/D) converter 116, a demodulator 140, a decoder 170, a digital-to-analog (D/A) converter 180, and an audio amplifier 185. The demodulator has a rake branch correlator 150, preferably with three fingers 152, 154, 156. A pilot correlation signal and a data correlation signal from each of the three fingers of the rake branch correlator 150 are sent to the RSSI path 163, the power control data path 161, and the primary data path 165 of a symbol rate processor 160. The output of the RSSI path 163 is connected to a microprocessor 117. The microprocessor 117 processes data, address, interrupt, and control lines throughout the entire subscriber unit 101. The microprocessor 117 is connected to other elements of the subscriber unit 101; however, these connections are not shown so as to not unduly complicate the drawing.

Primary data signals from the output of primary data path 165 are connected to decoder 170. The decoded symbols are sent to D/A converter 180 and audio amplifier 185 for audio reproduction of the received signal on speaker 135. As explained in U.S. patent application Ser. No. 08/624,329, filed Mar. 29, 1996 by Fuyun Ling et al., nearly optimal DS-CDMA downlink receiver performance can be achieved by using a low pass filter in the primary data path 165 to estimate the phase and gain of the communication channel. Achieving this near-optimal performance, however, results in a demodulation delay on the order of one to two milliseconds.

While such a modest delay is tolerable for speech communication, it is undesirable for detection and demodulation of a power control indicator transmitted in the traffic channel downlink from the base station and received at the subscriber unit. For example, the IS-95 specification requires that subscriber unit output power be established within 0.3 dB of its final value within 500 microseconds of receipt of a power control indicator by the subscriber unit. In order to minimize the time needed for power control indicator detection, power control indicators are not encoded and power control data signals from the output of the power control data path 161 are sent directly to a digital signal processor (DSP) 119. Accordingly, the power control indicator and the primary data traffic channel signals have separate demodulation paths. In certain applications, however, the microprocessor 117 can receive the recovered power control data signals instead of the DSP 119.

Figure 2:
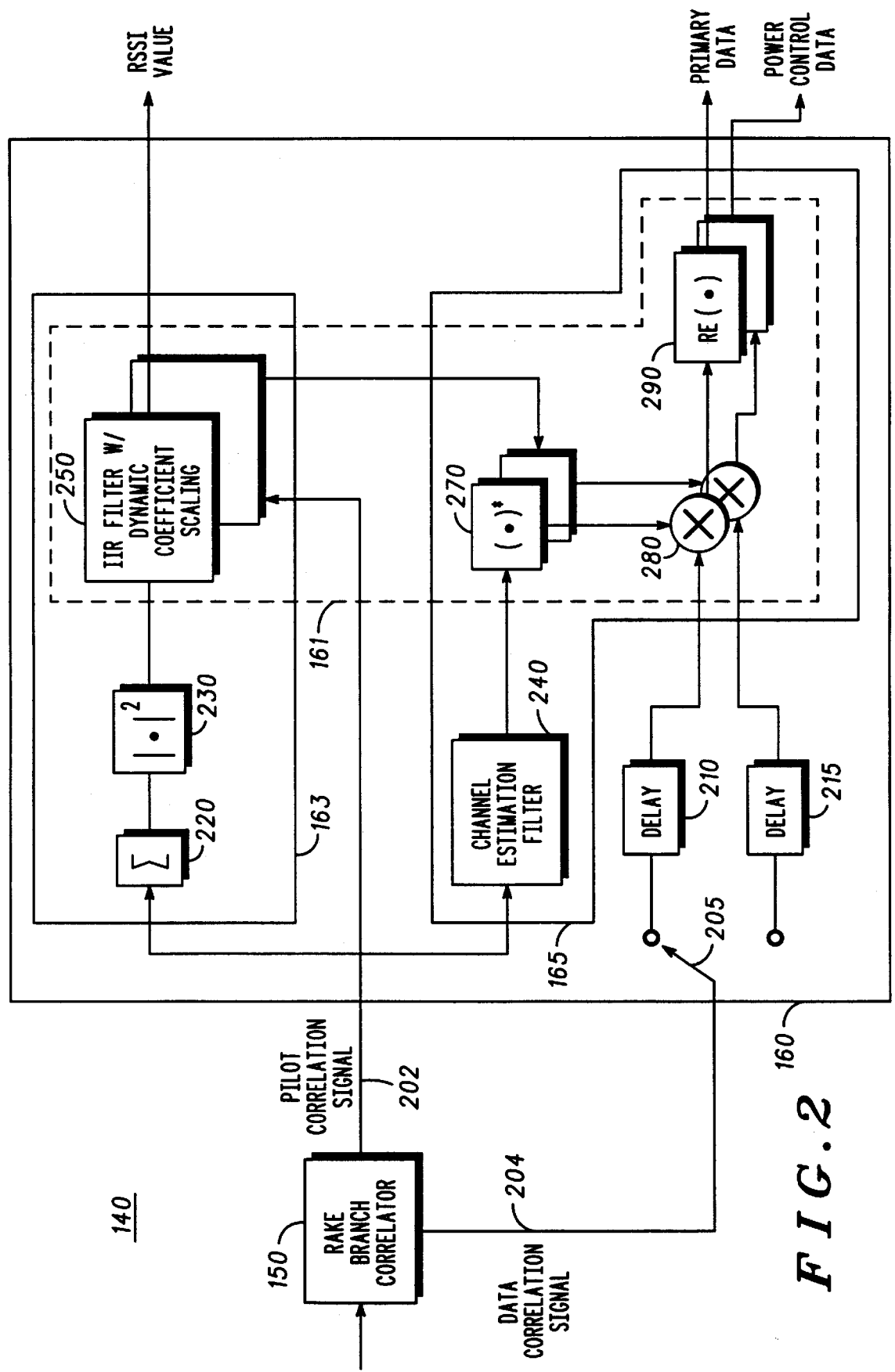
FIG. 2 is a block diagram of the demodulator shown in FIG. 1.

FIG. 2 is a block diagram of the demodulator 140 shown in FIG. 1. In order to reduce the delay in detecting a power control indicator without sacrificing traffic channel performance, the symbol rate processor 160 of the demodulator 140 separately demodulates power control indicators and primary data traffic channel signals. More specifically, the symbol rate processor 160 employs a power control data path 161 for demodulation of the power control indicator embedded in the traffic channel, having little or no demodulation delay, and a primary data path 165, having a longer delay, appropriate for nearly optimal demodulation of primary data signals.

Functionally, the primary data path and the power control data path are identical; they differ only in the implementation of the channel estimation filter. These filters are used to provide an estimation of the communication channel gain and phase, which is needed to demodulate data coherently. Specifically, the primary data path 165 uses a communication channel estimation filter 240 that optimizes performance at the cost of a delay in the recovered data stream. For example, a sixty-one tap finite-duration impulse response (FIR) filter yields nearly optimal performance with a delay of 1.5 milliseconds. This FIR filter can be replaced with an equivalent IIR filter, and a fourth-order IIR filter yields similar performance with approximately the same delay. In contrast, communication channel estimation in the power control data path should have a delay of less than 500 microseconds, according to the IS-95 specification, and a faster channel estimation filter is implemented with a one-pole IIR filter. The resulting data stream from the IIR filter has a negligible delay.

During operation, the rake branch correlator 150 generates a pilot correlation signal on line 202 and a data correlation signal on line 204. The pilot correlation signal is connected to the RSSI path 163, the power control data path 161, and the primary data path 165. In the primary data path 165, a channel estimation filter 240 estimates a complex representation of the communication channel phase and gain. A complex conjugate generator 270 takes the complex conjugate of the output of the channel estimation filter 240. Complex multiplier 280 multiplies this complex conjugate by the data correlation signal from line 204 that has been selected by switch 205 to be delayed for a predetermined amount of time using delay element 210. The delay value in delay element 210 is equivalent to the delay caused by channel estimation filter 240. Finally, a real component extractor 290 takes the real component of the complex multiplier 280 output to complete the coherent detection process and produce primary data signals.

Because the primary data path 165 and the power control data path 161 are nearly identical, the two data paths employ time-sharing to minimize hardware. For example, the complex conjugate generator 270, the complex multiplier 280, and the real component extractor 290 are time-shared between the power control data path 161 and the primary data path 165. The channel estimation filters for the primary data path and the power control data path, however, share no common circuitry. Instead, the one-pole IIR filter 250 in the RSSI path 163 includes dynamic coefficient scaling so that it can be time-shared with the power control data path 161.

In the power control data path 161, the pilot correlation signal on line 202 is sent to the IIR filter 250 with dynamic coefficient scaling. Like channel estimation filter 240, this one-pole IIR filter also estimates a complex representation of the communication channel phase and gain. The IIR filter 250 is not as optimal as the channel estimation filter 240, but it generates results with less delay. The complex conjugate generator 270 takes the complex conjugate of the output of the IIR filter 250 with dynamic coefficient scaling and connects the complex conjugate to complex multiplier 280. Switch 205 selects the data correlation signal on line 204 through delay element 215. The delay value in delay element 215 equivalent to any slight delay caused by IIR filter 250 with dynamic coefficient scaling. The real component extractor 290 takes the real component of the complex multiplier 280 output to produce power control data signals.

The switch 205 provides the data correlation signal from line 204 to either delay element 210 or delay element 215. Demodulator control unit 155 controls all time-sharing, including the operation of switch 205, within the demodulator unit 140. When the demodulator control unit 155 indicates that a primary data signal is to be processed, the switch 205 provides the data correlation signal to the delay element 210, and when the demodulator control unit 155 indicates that a power control data signal is to be processed, the switch 205 provides the data correlation signal to the delay element 215. Both delay elements 210, 215 are implemented as a first-in-first-out (FIFO) buffer. The delay of the delay element 215 is preferably less than 500 microseconds in order to conform with IS-95 specifications. Although the demodulated power control data and the demodulated primary data have different delay values, these delay values are fixed and known. Thus, there will be no confusion about the nature of the demodulated signals.

This approach of separately demodulating power control data is feasible because, with reference to a DS-CDMA system, the power control bits are uncoded and the error rate curve for an uncoded signal is typically quite flat in the signal-to-noise ratio range of interest. As a result, the IIR filter 250 with dynamic coefficient scaling estimates the communication channel phase and gain with little or no delay in order to demodulate and detect a power control indicator. The error rate of the power control indicator generated by using such a zero or short delay channel estimator is only slightly inferior to the error rate generated by using a nearly optimal channel estimator with sufficient delay. Thus, system performance will not degrade noticeably due to the use of a zero or short delay channel estimator in the power control data path.

The RSSI path 163 has an accumulator 220 that sums the pilot correlation signal over a certain number of symbol periods to create an averaged pilot correlation signal. Preferably, the pilot correlation signal is accumulated over eight consecutive symbol periods; however, faster RSSI computation can be achieved by accumulating as few as two symbol periods and more accurate RSSI computation can be achieved by accumulating over a larger number of symbol periods. A squaring block 230 squares and sums the real and imaginary components of the averaged pilot correlation signal from the accumulator 220 to obtain an energy estimate signal. Next, a one-pole IIR filter having unity gain filters the energy estimate signal from squaring block 230. The output of the IIR filter, the RSSI value signal, provides an update of the signal strength to the microprocessor 117 (shown in FIG. 1).

The coefficient set used by the IIR filter for RSSI path 163 processing and the coefficient set used by the IIR filter for channel estimation in the power control data path have no commonalities, and the two filters require radically different bandwidths. Thus, the IIR filter 250 includes dynamic coefficient scaling to allow time-sharing of the one-pole IIR filter between the RSSI path 163 and the power control data path 161.

Figure 3:
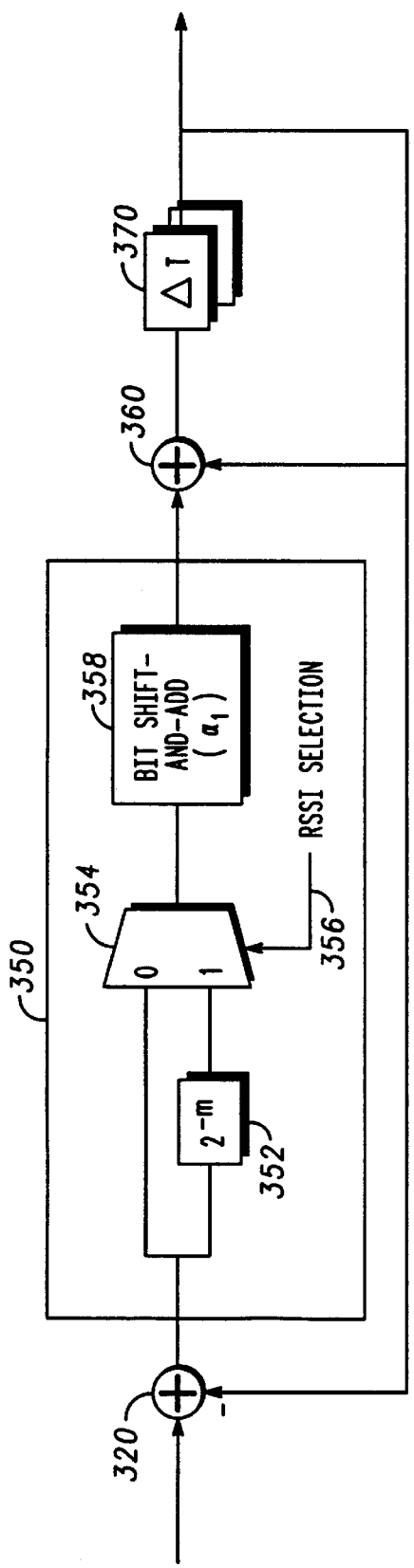
FIG. 3 is a block diagram of the infinite-duration impulse response (IIR) filter with dynamic coefficient scaling shown in FIG. 2.

FIG. 3 is a block diagram of a first embodiment of the IIR filter 250 with dynamic coefficient scaling shown in FIG. 2. The filter shown is a one-pole unity gain IIR filter. Dynamic coefficient scaling can be applied to other IIR filter realizations, including filters with multiple poles and zeros. By utilizing a dynamic coefficient scaling approach, the IIR filter in the RSSI path 163 can also be used as a channel estimation filter in the power control data path 161 (shown in FIG. 2). This IIR filter with dynamic coefficient scaling can be extended to any IIR filter set having differing bandwidths.

In general, a filter coefficient set can be expressed by $$\alpha_1 = \sum_{i=j}^{k} \{c[i]2^{-i}\},$$

where values for c[i] can be programmed to either 0 or 1. A second set yielding smaller coefficient values can be expressed by $$\alpha_2 = \sum_{i=j+m}^{k+m} \{c[i-m]2^{-i}\}.$$

Through a substitution of variables, it can be seen that $$\alpha_2 = \left[\sum_{i=j}^{k} 2^{-m}\{c[i]2^{-i}\}\right] = \left[2^{-m}\sum_{i=j}^{k}\{c[i]2^{-i}\}\right] = 2^{-m}\alpha_1.$$

As shown, coefficient set $\alpha_2$ is simply a scaled version of coefficient set $\alpha_1$. Therefore, bandwidths corresponding to coefficient set $\alpha_2$ can be achieved by time-sharing a filter implemented using coefficient set $\alpha_1$. The input to a bit shift-and-add block in a one-pole IIR filter is simply scaled by $2^{-m}$ whenever coefficient set $\alpha_2$ bandwidths are used. The value of m increases as the difference in bandwidth corresponding to the two coefficient sets increases. Because scaling by a single value requires no additional hardware, a power control data path filter can be implemented by adding to an RSSI filter only those gates needed to time-multiplex the input signals to a bit shift-and-add block.

Because the RSSI path 163 and the power control data path 161 (shown in FIG. 2) time-share the IIR filter 250 with dynamic coefficient scaling, the input signal can be either the output of the squaring block 230 in the RSSI path 163 or the pilot correlation signal on line 202 in the power control data path. The coefficient selection block 350 scales the output of adder 320 using $2^{-m}$ scaler 352. Multiplexer 354 selects the scaled signal or the non-scaled signal depending on whether the RSSI selection signal 356 is off or on. The selected signal is sent to bit shift-and-add block 358 having coefficient set $\alpha_1$. The output of the coefficient selection block 350 is connected to adder 360. Delay block 370 delays the output of the adder 360 and positively feeds back the delayed signal to adder 360 and negatively feeds back the delayed signal to adder 320. The delay of delay block 370 is equal to one symbol time period for the power control data path 161 and eight symbol time periods for the RSSI path 163 (shown in FIG. 2). These delays, as well as the timing for the RSSI selection signal 356, are determined by the demodulator control unit 155 (shown in FIG. 1).

Figure 4:
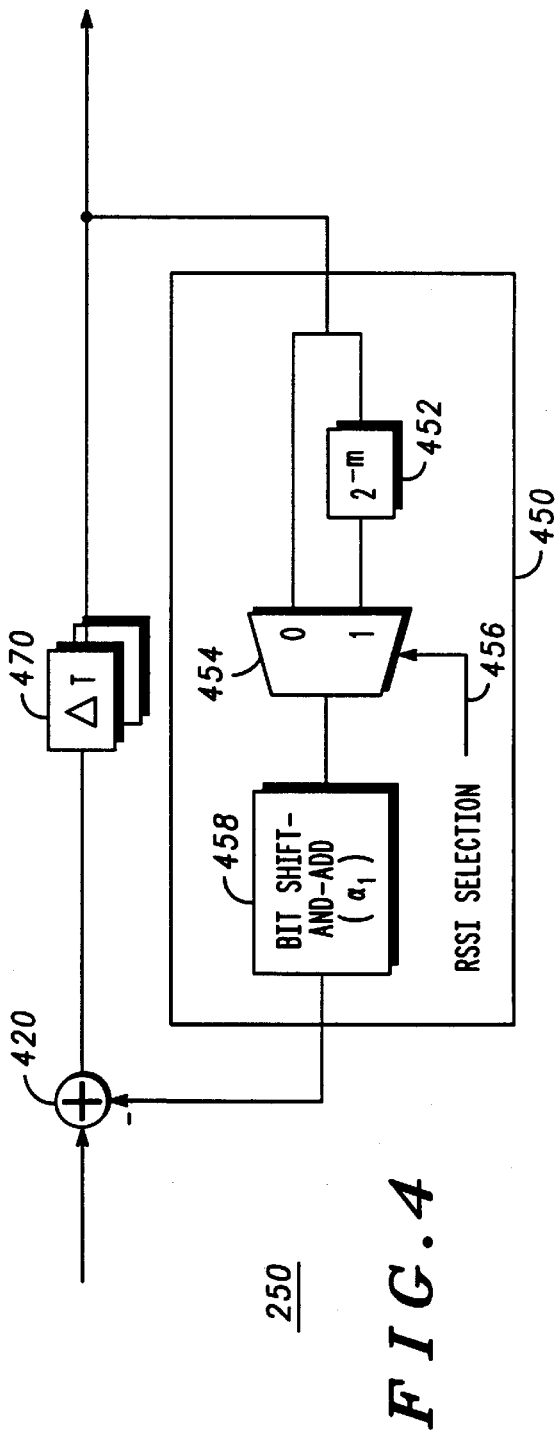
FIG. 4 is a block diagram of an alternate embodiment of the IIR filter with dynamic coefficient scaling shown in FIG. 2.

FIG. 4 is a block diagram of an alternate embodiment of the IIR filter 250 with dynamic coefficient scaling shown in FIG. 2. This filter is a one-pole IIR filter in a direct-form realization. Other IIR filter realizations may be used, of course, and the filter may be expanded to multiple poles or zeros.

The input signal to the IIR filter 250 can be either the output of the squaring block 230 in the RSSI path 163 (shown in FIG. 2) or the pilot correlation signal on line 202 in the power control data path 161 (shown in FIG. 2), because the RSSI path 163 and the power control data path 161 time share the IIR filter 250. In the IIR filter 250, delay block 470 delays the output of adder 420 by eight symbol time periods for the RSSI path 163 and one symbol time period for the power control data path 161. A coefficient selection block 450 scales the output of the delay block 470 using $2^{-m}$ scaler 452. Multiplexer 454 selects the scaled signal or the non-scaled signal depending on whether the RSSI selection signal 456 is off or on. The demodulator control unit 155 (shown in FIG. 1) controls the delay of delay block 470 as well as the timing of RSSI selection signal 456. The selected signal is sent to bit shift-and-add block 458 having coefficient set $\alpha_1$. The output of the coefficient selection block 450 is negatively fed back to adder 420.

Thus, CDMA power control channel estimation using dynamic coefficient scaling provides a low cost way to quickly demodulate power control indicators imbedded within CDMA traffic channel signals. While specific components and functions of the CDMA power control channel estimation using dynamic coefficient scaling are described above, fewer or additional functions could be employed by one skilled in the art within the true spirit and scope of the present invention. The invention should be limited only by the appended claims.

We claim:

1. A demodulator for producing a received signal strength indicator (RSSI) value signal and a power control data signal comprising:

an infinite-duration impulse response (IIR) filter with dynamic coefficient scaling having:
      an adder having an adder output;
      a coefficient selection block, coupled to the adder output, for selectively multiplying a signal at the adder output by either a first coefficient set or a second coefficient set; and
      a delay block, coupled to the coefficient selection block, for providing a negative feedback signal from the coefficient selection block to the adder.

2. A demodulator having an IIR filter with dynamic coefficient scaling according to claim 1 wherein the coefficient selection block comprises:
  a scaler block, coupled to the adder output, having a scaler block output;
  a switch, coupled to select either the adder output or the scaler block output, having a switch output; and
  a bit shift-and-add block, coupled to the switch output.

3. A demodulator having an IIR filter with dynamic coefficient scaling according to claim 2 wherein the switch is a multiplexer.

4. A demodulator having an IIR filter with dynamic coefficient scaling according to claim 1 wherein the coefficient selection block is controlled by a selection signal.

5. A demodulator having an infinite-duration impulse response (IIR) filter with dynamic coefficient scaling comprising:
  an adder;
  a delay block, coupled to the adder, having a delay block output; and
  a coefficient selection block, coupled to the delay block output, for selectively multiplying a signal from the delay block output by either a first coefficient set or a second coefficient set and providing a negative feedback signal to the adder.

6. A demodulator having an IIR filter with dynamic coefficient scaling according to claim 5 wherein the coefficient selection block comprises:
  a scaler block, coupled to the delay block output, having a scaler block output;
  a switch, coupled to select either the delay block output or the scaler block output, having a switch output; and
  a bit shift-and-add block, coupled to the switch output.

7. A demodulator having an IIR filter with dynamic coefficient scaling according to claim 6 wherein the switch is a multiplexer.

8. A demodulator having an IIR filter with dynamic coefficient scaling according to claim 5 wherein the coefficient selection block is controlled by a selection signal.

* * * * *